Dec. 4, 1951  H. A. MAGUIRE  2,577,586
TANK PLUG
Filed Jan. 15, 1948

INVENTOR.
HAROLD A. MAGUIRE
BY Fay, Golrick & Fay
ATTORNEYS

Patented Dec. 4, 1951

2,577,586

UNITED STATES PATENT OFFICE 2,577,586

TANK PLUG

Harold A. Maguire, Bedford, Ohio

Application January 15, 1948, Serial No. 2,531

1 Claim. (Cl. 85—9)

The present invention relates to a device for sealing an opening in the wall of a tank and more particularly the invention relates to an improved tank sealing device which can be readily applied to the tank without attention to the positioning of any elements of the sealing device on the interior of the tank.

In general, the device consists of a threaded shank having a cross pin at one end for engaging the interior of the tank wall for anchoring the shank to the tank wall and a sealing element on the shank which is adapted to be clamped against the outer wall of the tank by a nut threaded on the shank.

An object of the present invention is to provide a tank sealing structure by which the cross pin at the end of the shank may be moved laterally so that it projects from one side only of the shank to permit insertion of the end of the shank through an opening in the wall of the tank, and after the shank is inserted in the opening the cross member will be sprung to a position in which it extends laterally from opposite sides of the shank to form a firm anchorage with the tank wall.

Other objects and advantages of the invention will be apparent from the following description of a preferred form of the invention, reference being made to the accompanying drawings wherein.

Figure 1:
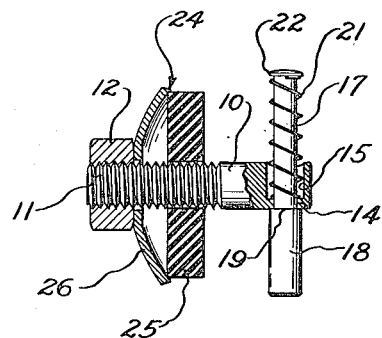
Fig. 1 is a view in section of a tank sealing device, sometimes referred to as a plug.

Referring now to the drawings, the plug structure comprises a shank 10 having a threaded portion 11 for receiving a nut 12. The unthreaded portion of the shank has a transversely extending opening formed therein, which opening has two diameters as indicated at 14 and 15. The diameter of the opening at 15 is somewhat larger than the diameter of the opening at 14, the reason for which will be apparent as the description proceeds.

A cross pin 17 extends through the transverse opening in the end of the shank 10 and approximately half of the pin has a larger diameter than the remainder of the pin as is indicated at 18. The enlarged end of the pin forms a shoulder at 19, which shoulder is adapted to abut the portion of the shank surrounding the transverse opening and thereby position the cross pin 17 to extend laterally from opposite sides of the shank.

A coil spring 21 is disposed about the pin 17 and one end of the spring rests in the inner end of the transverse opening and in the portion 15 thereof, and the upper end of the spring engages a shoulder 22 formed at the end of the pin. The spring 21 normally retains the pin 17 in a position in which the shoulder 19 abuts the shank 10, as is illustrated in Figs. 1 and 3 so that normally the pin will extend from opposite sides of the shank. The diameter of the spring is such that the pin 17 may be moved in the direction which is downward in Fig. 1 so that the end of the pin carrying the shoulder 22 will be flush with the side of shank 10 and spring will be compressed within the section 15 of the transverse opening in the shank. This condition is illustrated in Fig. 2 wherein the pin is shown depressed manually preparatory to insertion of the pin carrying end of the shank through an opening in a tank wall.

A sealing element 24 is mounted to the shank 10 and this element consists of a rubber or rubber-like washer 25 and a dish shaped metallic backing member 26, the concave portion of which member faces the washer 25. The sealing element 24 is adapted to be pressed against the wall of the tank surrounding the opening in the tank by screwing the nut 12 on to the shank 10. As may be seen in Fig. 3, the pin 17 extends from the shank 10 to form an anchorage for the end of the shaft 10 inside the tank so that the element 24 may be tightly pressed to the wall of the tank.

Figure 2:
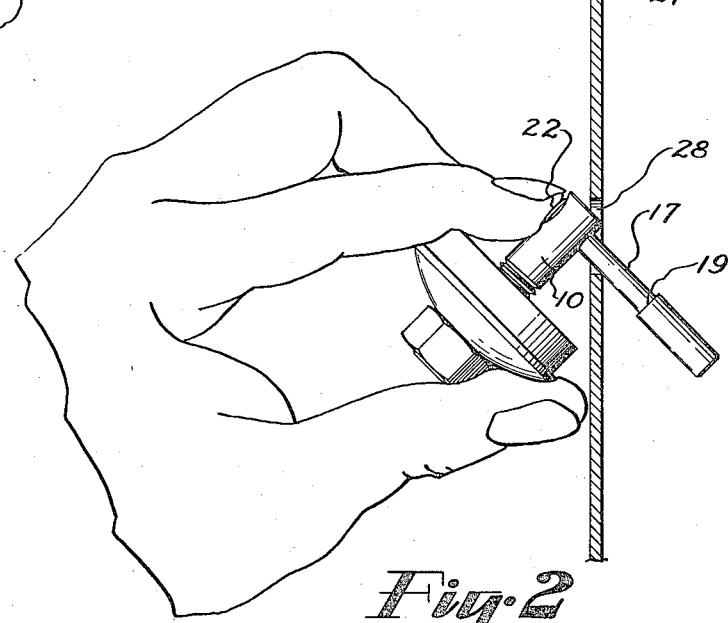
Fig. 2 is a view showing the plug being applied to the wall of the tank.
Figure 3:
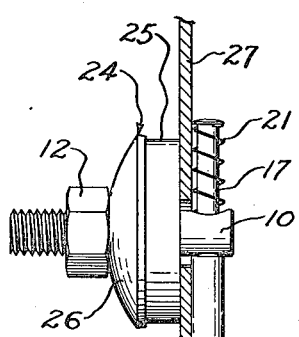
Fig. 3 is a view showing the plug attached to the tank wall.

The use of the plug is illustrated in Figs. 2 and 3 wherein a section of a tank wall 27 is shown having an opening 28 which is desired to be plugged. The end of the shank 10 carrying the pin 17 is inserted through the opening 28 by depressing the pin against the action of the spring 21 so that the pin extends entirely from one side of the shank 10 which enables the pin to be inserted through the opening 28. It will be noted that the end of the pin 17 carrying the shoulder 22 will be flush with the wall of the shank 10 so that that end of the pin will not interfere with the insertion of the shank into the opening. After the shank is inserted into the opening the spring 21 forces the pin 17 to the cross-wise position in which the pin extends from opposite sides of the pin to engage the interior of the wall 27 as may be seen in Fig. 3. It will be noted that this structure will insure proper positioning of the pin 17 regardless of the position in which the shank 10 is placed, that is to say the positioning of the pin 17 will not be dependent upon gravity and therefore the shank 10 may be placed in a horizontal or vertical direction as desired and when the pin 17 is released it will always assume the position relative to shank 10 as is shown in Fig. 3. The nut 12 is then tightened to press the sealing element 24 against the wall 27 to form a tight seal about the opening 28.

By my invention I have provided a sealing plug which can be applied to the wall of a tank from the exterior only and in which the anchoring element of the plug will be properly positioned in the interior of the tank regardless of the position of the plug shank relative to vertical.

Although I have described but one form of the invention, it is to be understood that other forms might be adopted, all falling within the scope of the claim which follows.

I claim:

In a device for plugging an opening in the wall of a tank or the like, a shank insertable through the opening to be plugged, said shank having a transverse opening through one end thereof, one section of the opening having a larger diameter than that of the remainder of the opening and forming a shoulder within the opening; a cross pin slidable in the opening and having a shoulder at the central portion adapted to abut the shank at the smaller end of said transverse opening for positioning the cross pin; and a spring adapted to be compressible entirely within said one section of the transverse opening and surrounding the portion of the cross pin extending in said one section of said opening and resting on the first mentioned shoulder, the end of the said portion of the pin having a stop having an axial length that is a small fraction of the axial length of the pin and being engaged by said spring and having a diameter less than the diameter of the opening in said one section whereby said spring and stop are adaptable to be concealed in said opening having the larger diameter when said pin is in position for insertion through the opening in the wall of said tank, and said spring being adapted to normally maintain the pin in a position in which the shoulder on the pin is in engagement with the shank, said spring when the pin is in said latter position being exposed to one side of the shank for a considerable portion of its length.

HAROLD A. MAGUIRE.

REFERENCES CITED

The following references are of record in the file of this patent:

UNITED STATES PATENTS

| Number | Name | Date |
|---|---|---|
| 88,338 | Smith | Mar. 30, 1869 |
| 1,530,097 | Wagner et al. | Mar. 17, 1925 |
| 1,563,743 | Hazlewood | Dec. 1, 1925 |
| 2,416,548 | Schaul | Feb. 25, 1947 |
| 2,447,913 | Robinson | Aug. 24, 1948 |

FOREIGN PATENTS

| Number | Country | Date |
|---|---|---|
| 379,130 | Great Britain | Aug. 25, 1932 |